J. STORY.
Connecting Parts of Glass or China Ware Utensils.

No. 219,418. Patented Sept. 9, 1879.

Witnesses:

Inventor:

UNITED STATES PATENT OFFICE.

JOHN STORY, OF BALDWIN TOWNSHIP, ALLEGHENY COUNTY, PA.

IMPROVEMENT IN CONNECTING PARTS OF GLASS OR CHINA WARE UTENSILS.

Specification forming part of Letters Patent No. 219,418, dated September 9, 1879; application filed August 2, 1879.

*To all whom it may concern:*

Be it known that I, JOHN STORY, of Baldwin township, in the county of Allegheny and State of Pennsylvania, have invented certain new and useful Improvements in Connecting Parts of Glass or China Ware Utensils; and I do hereby declare the following to be a full, clear, and exact description of the invention, such as will enable others skilled in the art to which it pertains to make and use it, reference being had to the accompanying drawings, which form part of this specification.

My invention relates to an improvement in the manner of connecting parts of glass or china ware utensils; and it consists in first shaping one of the parts to be attached for the retention of a soft-metal threaded bush, to which the other part, having a mother-screw, is attached, as will be fully described hereinafter.

The accompanying drawings represent my invention.

Figure 1:
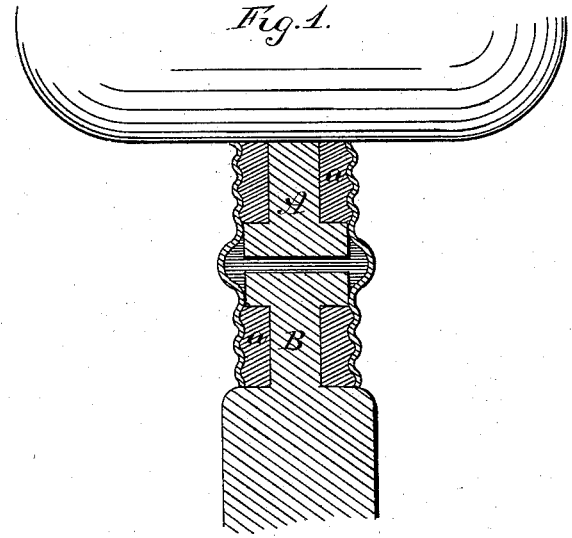
Figure 2:
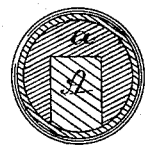
Figure 3:
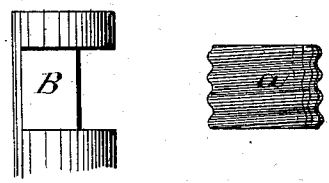

Figure 1 is a vertical section of my invention. Fig. 2 is a horizontal cross-section of the same. Fig. 3 is a detail view of both the standard and coupling.

A represents one part of the utensil to be attached, and B the other. The end or part of A to which the part B is to be attached is shaped, as shown, like a T, slightly increasing toward the upper end for the reception of the bush *a*. The bush *a* is made of soft metal, and occupies the space under the head of the T-shaped end, inclosing three sides of it. On the outside of the bush is a screw-thread, to which the mother-screw on B fits, which mother-screw may be formed in the material of which the part B is made, or may be of metal attached thereto.

It frequently occurs that the places at which a connection of two separate parts of utensils is to be made are inaccessible to the tools by which a screw-thread is turned, but seldom that they cannot be reached and formed to receive and hold the bush, on the outside of which the thread is already made for a connection.

The object of my invention is, first, to be enabled to make a connection wherever it may be necessary or most convenient, regardless of the screw-thread required for that purpose, and, secondly, to avoid a contact of two hard substances, one of which being brittle and liable to break when sufficient force is applied to make a reliable connection.

I am aware that a screw-thread formed on glass utensils to connect its parts is old, and this I disclaim; but

What I claim, and wish to secure by Letters Patent, is—

A threaded bush of soft metal, secured to any part of a glass or china ware utensil, in a place prepared for that purpose, to form a connection with another part of the utensil, having a mother-screw, substantially as shown and described.

In testimony that I claim the foregoing I have hereunto set my hand this 29th day of July, 1879.

JOHN STORY.

Witnesses:
T. F. LEHMANN,
SAML. DIESCHER.